United States Patent
Krieger

(10) Patent No.: US 7,991,588 B1
(45) Date of Patent: Aug. 2, 2011

(54) POWER CONSUMPTION MEASUREMENT

(75) Inventor: Ken Krieger, Jackson, WY (US)

(73) Assignee: Exaflop LLC, Mountain View, CA (US)

( * ) Notice: Subject to any disclaimer, the term of this patent is extended or adjusted under 35 U.S.C. 154(b) by 276 days.

(21) Appl. No.: 12/020,339

(22) Filed: Jan. 25, 2008

Related U.S. Application Data

(60) Provisional application No. 60/915,335, filed on May 1, 2007.

(51) Int. Cl.
*G06F 11/30* (2006.01)
(52) U.S. Cl. .......................... 702/186; 702/60
(58) Field of Classification Search .............. 702/60, 702/61, 63–65; 713/340; 324/141, 142
See application file for complete search history.

(56) References Cited

U.S. PATENT DOCUMENTS

| | | | | |
|---|---|---|---|---|
| 5,761,085 A | * | 6/1998 | Giorgio | 702/33 |
| 5,809,449 A | * | 9/1998 | Harper | 702/63 |
| 6,892,147 B2 | * | 5/2005 | Bui et al. | 702/63 |
| 7,844,839 B2 | * | 11/2010 | Palmer et al. | 713/300 |
| 2003/0115242 A1 | * | 6/2003 | Hayduk | 709/103 |

* cited by examiner

*Primary Examiner* — Manuel L Barbee
(74) *Attorney, Agent, or Firm* — Fish & Richardson P.C.

(57) ABSTRACT

The subject matter of this specification can be embodied in, among other things, a method that includes transitioning an electrical load from a primary power supply to an alternative power supply, measuring power drawn from the alternative power supply, transitioning the electrical load from the alternative power supply to the primary power supply, and estimating the power drawn from the primary power supply by the electrical load using the measured power drawn from the alternative power supply.

24 Claims, 7 Drawing Sheets

POWER CONSUMPTION MEASUREMENT

RELATED APPLICATIONS

This application claims benefit from Provisional Application No. 60/915,335 filed on May 1, 2007 entitled "Power Consumption Management," the entirety of which is incorporated by reference here.

TECHNICAL FIELD

Certain implementations of systems and methods for circuit management are described.

BACKGROUND

Computers have become widely adopted for various applications, for both personal and corporate uses. Some computers operate as stand-alone data processing equipment, with perhaps a peripheral such as a printer and a display device. Although useful for many purposes, additional features and benefits may be achieved if multiple computers are networked together to share information and resources.

A computer network may be formed by connecting two or more computing devices with an information channel. One type of network is a local area network (LAN). A typical residential LAN, for example, may connect two computers to a printer. A typical corporate LAN, for example, may allow many users to share resources and large amounts of information, including databases and application software.

A second type of network is a wide area network (WAN). A prime example of a WAN is the Internet. WANs such as the Internet allow many computer devices to communicate messages and share information. When multiple LANs are interoperable with one or more WANs, opportunities for computing devices to communicate and share information greatly expand.

From the perspective of an individual computing device that is connected to a network, users may direct the communication of information over a network with a user interface generated by a web browser application. A web browser is typically configured to enable the user to access web sites on the Internet or the World Wide Web. Web browsers allow users to easily send and receive messages over a network in packets of information. Such packets of information may include the address of a search engine website, such as www-.dogpile.com, for example.

The popularity and simplicity of sharing information over networks, such as the Internet, has resulted in demand for data processing and storage capacity to support high network traffic volume. One mechanism to address this demand may be referred to as a data center. In the context of the Internet, a data center may provide processing, storage, and support functions that improve performance or enhance the utility of the Internet. Data centers may also be deployed in other contexts. Financial institutions, for example, may employ one or more data centers to store financial account and transaction information.

A data center may provide data processing and storage capacity. In operation, a data center may be connected to a network, and may receive and respond to various requests from the network to retrieve, process, or store data. In addition to extensive data processing and data storage capabilities, data centers typically support high-speed data transfer and routing capabilities. To meet future network demands, data center capacity may continue to expand.

SUMMARY

In general, systems and methods for measuring power consumption are described.

In a first general aspect, a method is described. The method includes transitioning an electrical load from a primary power supply to an alternative power supply, measuring power drawn from the alternative power supply, transitioning the electrical load from the alternative power supply to the primary power supply, and estimating the power drawn from the primary power supply by the electrical load using the measured power drawn from the alternative power supply.

In a second general aspect, a system is described. The system includes a first power input port coupled to a first power supply, a second power input port coupled to a second power supply, an output port coupled to an electrical load; and a controller and a data store that includes instructions to cause the controller to perform operations for estimating the power drawn from the primary power supply. The operations include decoupling the output port from the first power input port and coupling the output port to the second power input port, determining power consumed from the second power input port, and decoupling the output port from the second power input port and coupling the output port to the first power input port.

In another general aspect, a system is described, where the system includes a means to estimate power drawn from a first power supply by performing operations. The operations include transitioning an electrical load from the first power supply to a second power supply, measuring power drawn from the second power supply, and transitioning the electrical load from the second to the first power supply. The system also includes an interface to output the estimate of the power.

The described implementations may provide one or more of the following advantages: First, the power usage of a system can be measured using an energy efficient method. Second, power measurement for a system can be used to shift processing loads to or from the system. Third, power consumption for a system can be measured using inexpensive components. Fourth, the robustness and reliability of a system can be increase by measuring power consumption for the system's components at different times.

Details of one or more implementations are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION OF ILLUSTRATIVE IMPLEMENTATIONS

A rack containing a modular array of rack-mountable processing units may be referred to as a server. Interconnecting multiple servers can form a data center. A data center can provide data processing and storage capacity. These functions can be distributed across the multiple servers. The distribution can be such that the computational requirements for a particular function can be distributed among multiple processing units located in multiple servers in an effort to distribute the computational load as well as the processing circuit loads among multiple servers within a data center. This can be referred to as load balancing.

In certain implementations, computational load on servers in a data center can be determined based on an amount of electrical power consumed by the server. The measured power consumption for the servers can be used to determine which servers are handling more processing, which in turn, can be used to shift processing tasks among the servers.

One implementation for measuring a processing circuit load may include the measurement of the power dissipated across a resistor shunt in series with the output of a back-up battery for a server. The back-up battery can supply a DC voltage to the server's components when power output from a primary power source is intentionally or unintentionally interrupted. The voltage drop across the resistor shunt in series with the battery can be measured. Knowing the value of the resistor and the voltage drop across the resistor, the current through the resistor shunt can be determined. For example, using a derivative of Ohms law, the power dissipated across the resistor shunt can be determined which indicates the processing circuit load. Once the measurement is complete, the server's power can be switched back from the back-up battery to the primary power source.

Figure 1:
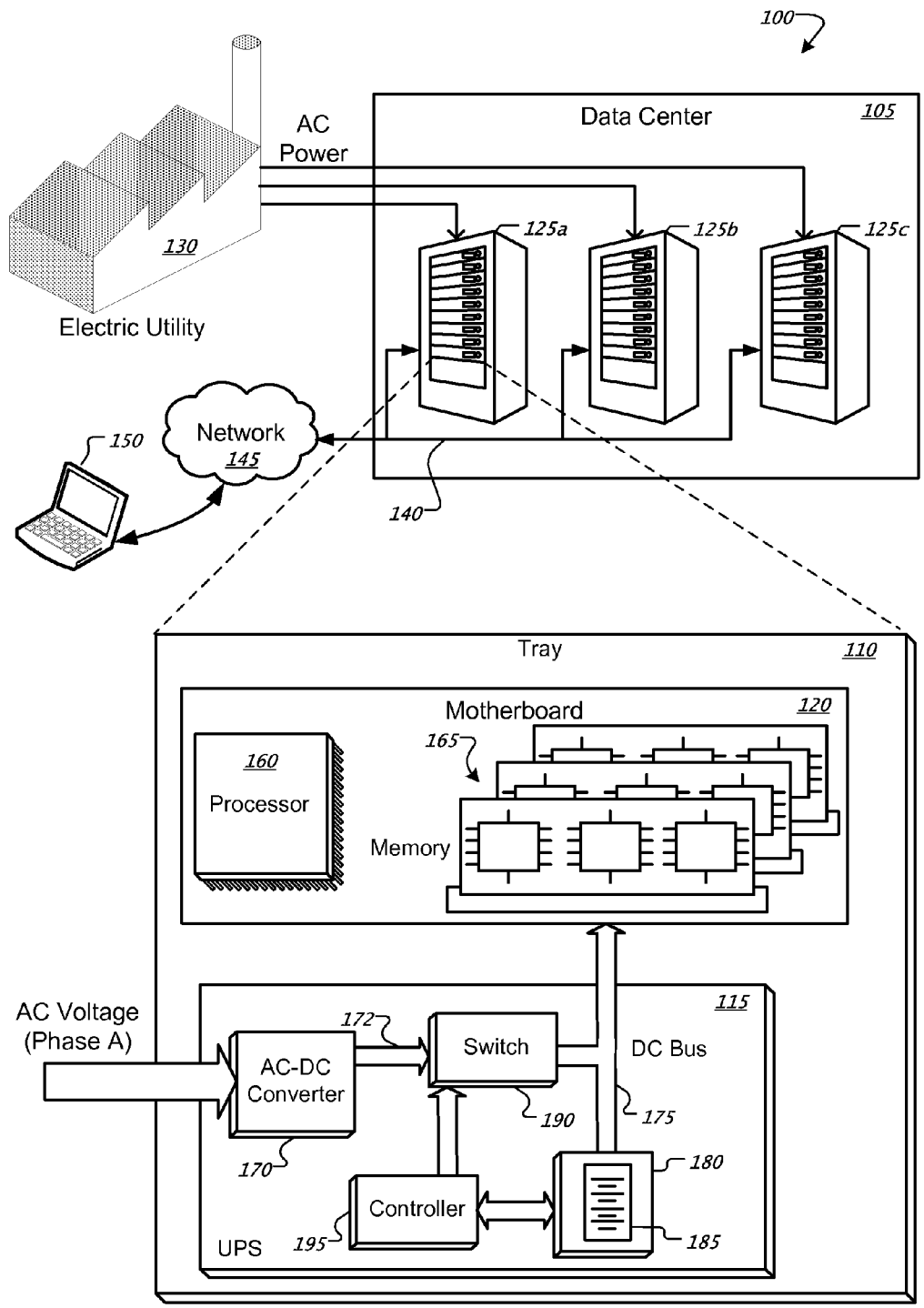
FIG. 1 is a schematic diagram illustrating an exemplary power distribution architecture for a data center in which each of a number of modular trays inserted in racks include power measurement circuitry interposed between a UPS and a system load.

FIG. 1 is a schematic diagram illustrating an exemplary power distribution architecture 100 for a data center 105 in which each of a number of modular rack-mounted bases (which may also be referred to as trays) 110 includes an uninterruptible power supply (UPS) 115 integrated with a computer motherboard 120. Efficient power delivery may be achieved by configuring the UPS 115 to perform the only AC-to-DC rectification that occurs between the AC mains power received from the electric utility grid and the DC power consumed by the motherboard 120.

In this example, AC mains refers to the AC power source available at the point of use in the data center 105. When received in the data center 105 at the UPS 115, the AC mains voltage is a substantially sinusoidal AC signal (e.g., 50 Hz, 60 Hz) that was generated, transmitted, and distributed by the electric utility. The AC mains input voltage can be converted to a single DC voltage 172 by an AC-DC converter 170, and the single DC voltage 172 can be input to switch 190. In certain implementations, switch 190 can connect or disconnect the single DC voltage 172 to a DC bus 175. A battery circuit 180 including battery 185 can also be connected to DC bus 175. The DC bus 175 delivers operating power to the motherboard 120.

Under certain situations, such as a fault on the AC mains, the battery circuit 180 containing battery 185 can supply operating power to the motherboard 120.

Additionally, the battery circuit 180 can be electrically connected to the motherboard 120 in order to measure the power output of the battery 185. The battery circuit 180 can include circuitry—an example of which is show in FIG. 2B—that can be used to measure, for example, the current on the DC bus 175 that connects the battery circuit 180 to the motherboard 120 (or other connected electrical load).

The measured power output by the battery can be used to determine the power output of the AC-DC Converter 170. For example, the power output by the battery 185 may approximate power output by a source or conduit of the AC mains input voltage (e.g. AC-DC converter) because the load is the same.

In certain implementations, the measured power outputs can be used to derive statistical information about the power output of a power source or the power consumption of an electrical load (such as the motherboard 120). For example, periodic connection of the battery circuit 180 to the motherboard 120 permits measurements of the power consumption of the motherboard 120 at various points in time, where the measurements can be used to determine the average as well as the maximum and minimum power consumption of the motherboard 120 over a time period.

The exemplary data center 105 of FIG. 1 includes a number of racks 125A, 125B, 125C that contain a number of the trays 110. Each rack 125 may have an independent power usage value for each tray 110 in the rack. This value can be used to determine or control load balancing between trays 110 within or between racks. The circuitry on a motherboard, for example, motherboard 120, can be used to execute various software algorithms, which may be stored in the memory 165. The execution of the algorithms can involve the use of varying degrees of processing power by the processor 160. For example, a more complex algorithm can require more processing power resulting in increased power usage for the tray 110, which includes the motherboard 120.

Additionally, the power usage of each tray 110 of a rack can be aggregated to provide a total power usage value for the rack. The total power usage values can be used, for example, to determine or control load balancing between racks. Also, the power usage for each rack, 125A, 125B, and 125C, for example, can be aggregated to provide the total amount of power being used by the data center 105. In certain implementations, this value can be used to determine or control load balancing between data centers.

The AC power line voltages delivered to each of the racks 125A-125C may originate from a rotating generator operated by the electric utility and driven by a steam or gas turbine, for example. The AC voltage signals, which are substantially sinusoidal, may be transmitted to a distribution point, such as a substation (not shown) in the utility grid, for example. The power line voltages (e.g., 480 V line-to-line) may be distributed from the substation to the data center 105. In the data center 105, individual phase voltages (e.g., 208 V line-to-neutral) are routed to the individual racks 125A-125C. Suitable AC-to-AC transformers (not shown) may be employed, as necessary, to deliver the AC power at a specified AC voltage. For example, step-down transformers may transform AC power from high voltage levels suitable for transmission to levels that can be substantially directly applied to the UPS 115. In some three phase configurations, for example, such transformers may make appropriate transformations between WYE and DELTA connections if required.

Each of the trays 110 in the depicted example is coupled to a network connection 140. The network connection 140 provides an information channel to a network 145, which may include, for example, a local area network, virtual private network, wide area network (e.g., the Internet), or a combination of such networks, which may be wired, fiber optic, or wireless. A remote computer 150 represents one of many possible devices that could communicate data directly or indirectly with one or more trays to access, store, process, or retrieve information using a processor 160 and associated memory 165 on the motherboard 120. In some implementations, additional processors (e.g., servers) may facilitate such communication. For example, the remote computer device 150 may be included in a server, a desktop computer, a laptop computer, or a handheld processor-based device. One or more servers may pre- or post-process, supervise, route, or balance the flow of data associated with the communication.

In various implementations, the motherboard 120 may include one, two, three, or any other practicable number of processors 160. In some implementations, the motherboard 120 may be replaced with tray of data storage devices (e.g., hard disk drives, flash memory, RAM, or any of these or other types of memory or processors in combination). In such implementations, the UPS 115 with the battery 185 may be integrated with the data storage devices and supported on the tray 110. In various implementations, a digital processor may include any combination of analog or digital logic circuits, which may be integrated or discrete, and may further include programmable or programmed devices that may execute instructions stored in a memory. The memory 165 may include volatile or non-volatile memory that may be read or written to by the processor 160. The motherboard 120 may further include some or all of a central processor unit(s) (CPU), memory (e.g., cache, non-volatile, flash), or disk drives, for example, along with various memories, chip sets, and associated support circuitry.

In some implementations, the motherboard 120 provides one or more DC-to-DC converters to convert the DC bus voltage to a suitable voltage for operating the circuitry on the motherboard 120. For example, one or more DC-to-DC converters may provide regulated output voltages, which may include, for example, a +3.3VDC power signal, a +5VDC power signal, a −5VDC power signal, a +12VDC power signal, and a −12VDC power signal.

In certain implementations, the processor 160 and the memory 165 on the motherboard 120 may form at least a part of a processing system configured to handle network operations. As an illustrative example, the motherboard 120 may help to process Internet requests. The motherboard may process information either alone or in combination with other parallel processes running on other processor-based devices, such as one or more other trays 110 in the data center 105.

An AC input voltage signal is delivered to each of the trays 110 to be processed by the UPS 115. In some examples, the AC input voltage signal may be received from the AC mains. The AC-to-DC converter 170 can convert the AC input voltage signal to a regulated DC voltage. The converter 170 outputs the regulated DC voltage 172 onto the DC bus 175 via switch 190. In some implementations, the AC-to-DC converter 170 may regulate the DC voltage 172 to a static set point. In some other implementations, the set point may be dynamically determined. In some of the static and dynamic implementations, the set point may be based on a characteristic of the battery 185.

The AC-to-DC converter 170 may maintain voltage regulation on the DC bus 175 when the AC input voltage signal is in a normal range. A normal range for a typical sinusoidal AC signal may be specified in various ways. For example, one or more thresholds may be specified between about 80 V and 500 V for line frequencies that may be between about 40 Hz and 1000 Hz, such as around 50 Hz, 60 Hz, 100 Hz, 200 Hz, 300 Hz, 400 Hz, 500 Hz, . . . , and up to about 1000 Hz or more. As an illustrative example, for a 120 V nominal AC input voltage signal, a fault may be identified if the AC peak input voltage falls below a first threshold of 90 V in any half cycle, or if the r.m.s. voltage drops below a second threshold of 100 V for a predetermined amount of time. Fault conditions may include, without limitation, blackouts, brownouts, voltage sags, surges, instabilities related to switchgear operation, or other electrical transient associated with the AC mains. In some implementations, a fault condition may cause or potentially cause improper operation of a processing unit in the DC load, for example, if the AC-to-DC converter 170 is unable to maintain adequate regulation of the voltage on the DC bus 175, or to supply sufficient current to operate the DC loads serviced by the DC bus 175.

If the AC input voltage signal falls outside of a normal range, such as during a fault condition, a detection circuit (not shown) may send a signal indicative of this condition. In response to detecting the fault condition, the battery circuit 180 may be configured so that the motherboard 120 can continue to operate substantially without interruption. The battery 185 may continue to provide operating power to the circuits on the motherboard 115 until the battery 185 substantially discharges. The battery circuit 180 may include circuitry capable of controlling the charging or discharging the battery across the DC bus 175 in various operating modes. An example battery circuit is described in further detail with reference to FIGS. 3A and 3B.

As discussed above, in certain implementations, the control circuitry may also disconnect the regulated DC voltage 172 from the DC bus 175. This effectively connects battery power to the DC bus 175. This may be performed when testing the power consumption of a connected electrical load (e.g., the motherboard 120).

In certain implementations, the control circuitry includes a controller 195 that uses switch 190 to disconnect the DC voltage 172 from the DC bus 175. The electrical load is then effectively connected to the battery 185. This may be done based on a signal initiated by a timer set for a predetermined delay, which can be stored in memory 165. The controller 195, for example, can modify the predetermined delay if the controller receives a command to update the delay time from an external host (e.g. remote computer 150).

In certain implementations, the controller 195 can receive commands from an external host to disconnect the DC voltage 172 via switch 190, which connects the electrical load to the battery 185 for power measurements. For example, an operator using remote computer 150 may input a command that is transmitted to the control circuitry on the tray 110. In certain implementations, this command can be transmitted through a network to a tray, where it can be communicated to the control circuitry using a system management bus (SM-Bus) on the tray.

The command can specify that the tray 110 in rack 125A is to enter a battery backup mode, which includes the disconnection of the DC voltage 172 via switch 190, effectively connecting the electrical load to the battery 185. The command can also include instructions to perform a power measurement and to send the results of the measurement to the remote computer 150 using network 145. The result of the power measurement can be stored in memory on the remote computer 150.

In certain implementations, the measurement value can be used to manage the power usage of, for example, the tray 110, the rack 125A, or the data center 105. For example, the measurement value can be compared with a predetermined threshold level to determine if the power consumption of the tray 110 is nominal, below nominal, or excessive. If the power consumption of the tray is determined to be excessive, for example, the remote computer 150 may redistribute the processing load from that tray to another tray in the rack 125A (or in another rack).

For example, the results of power measurements for several trays can be stored in memory on a single tray within the rack. A controller (e.g., the controller 195) on the tray having the stored measurements can receive commands from an external host to send the measurements for the multiple trays to, for example, the remote computer 150 using network 145.

The remote computer 150 can use the results to manage the power usage of individual trays or the rack. The individual power measurements for each tray can be compared to a predetermined threshold level stored at the remote computer 150 to determine if the tray's power consumption is above or below a nominal level. The remote computer can then redistribute processing load from a tray, for example, that is operating at above the nominal level to a tray that is operating below the nominal level.

In other implementations, a tray can initiate the distribution of processing load by transmitting a request to the remote computer 150 to redistribute the processing load among the trays. For example, a controller (e.g., controller 195) on a tray (e.g., tray 110) can compare the measurement values for that tray to one or more threshold values associated with the tray. If the measurement values indicate, for example, that the motherboard 120 is consuming excessive energy, the controller 195 can transmit a message to the remote controller requesting that some of the processing load currently being handled by the tray be offloaded to different trays.

In still other implementations, a tray can request that other trays accept excess processing load without relying on the remote computer 150 for redistribution of the processing load among the trays. For example, after comparing the measurement values to the threshold values, the controller 195 can transmit messages to different trays (within or outside of the rack that includes the tray) that request that the other trays accept processing requests currently being handled by the tray.

In certain implementations, the other trays can respond by accepting the entire request for processing or by accepting a portion of the processing load. For example, a tray that receives a request to handle additional processing tasks can use its own stored power measurements to determine how many additional processing tasks it can accept before exceeding stored processing threshold values.

As discussed above, a controller on a tray can disconnect the output of the AC/DC converter 170 from the DC bus 175 by sending a control signal to the switch 190. In certain implementations, this causes the switch 190 to transition from a closed position to an open position, which transitions the tray to run on battery power. In certain implementations, the measurement of the processing circuit load can be performed by taking the measurement of the power dissipated across a resistor shunt that is in series with a battery bus which supplies the voltage provided by the battery 185 to the DC bus 175. For example, at a predetermined time, the controller 195 can send a command to open the switch 190. This causes the DC voltage 172 to disconnect from the DC bus 175, which disconnects the DC voltage 172 from, first, the processing circuit and, second, the battery providing power to the processing circuit. A voltage drop can then be measured across the resistor shunt that is in series with the battery.

In certain implementations, the current through the resistor shunt can be determined using Ohms law if the value of the resistor and the voltage drop across the resistor are known. Once all or a part of the values are known, the power dissipated across the resistor shunt can be determined, which indicates the processing circuit load. Once the measurement is complete, the controller 195 can cause the switch 190 to close, which connects the DC voltage 172 back to the processing circuit.

The use of the previously described implementations to measure the processing circuit load may avoid using additional power from the non-battery DC voltage source. In an alternate implementation, the measurement of the processing circuit load can be performed by taking the measurement of the power dissipated across a resistor shunt that can be located in series with the output of the AC-DC converter 170. Power may be continuously dissipated across the resistor shunt during normal operation of a tray, which may result in additional power costs being incurred by the data center 105.

The previously described implementations may use an inexpensive component, namely a resistive shunt in series with the battery. An alternate implementation for measuring a processing circuit load may include the placement of a Hall Effect sensor in series with the output of the AC-to-DC converter 170 or the battery.

The previously described implementations may have the advantage of providing periodic, or recurring, information about the state of the battery. When the output of the AC/DC converter 170 is disconnected from the DC bus 175 by the switch 190, the battery 185 can provide power to the DC bus 175. In another implementation, circuitry can be implemented that determines the state of the battery by determining its voltage value, for example, as well as how much power it can provide to the processing circuit. These measurements can be performed along with the measurement of the processing circuit load.

Figure 2A:
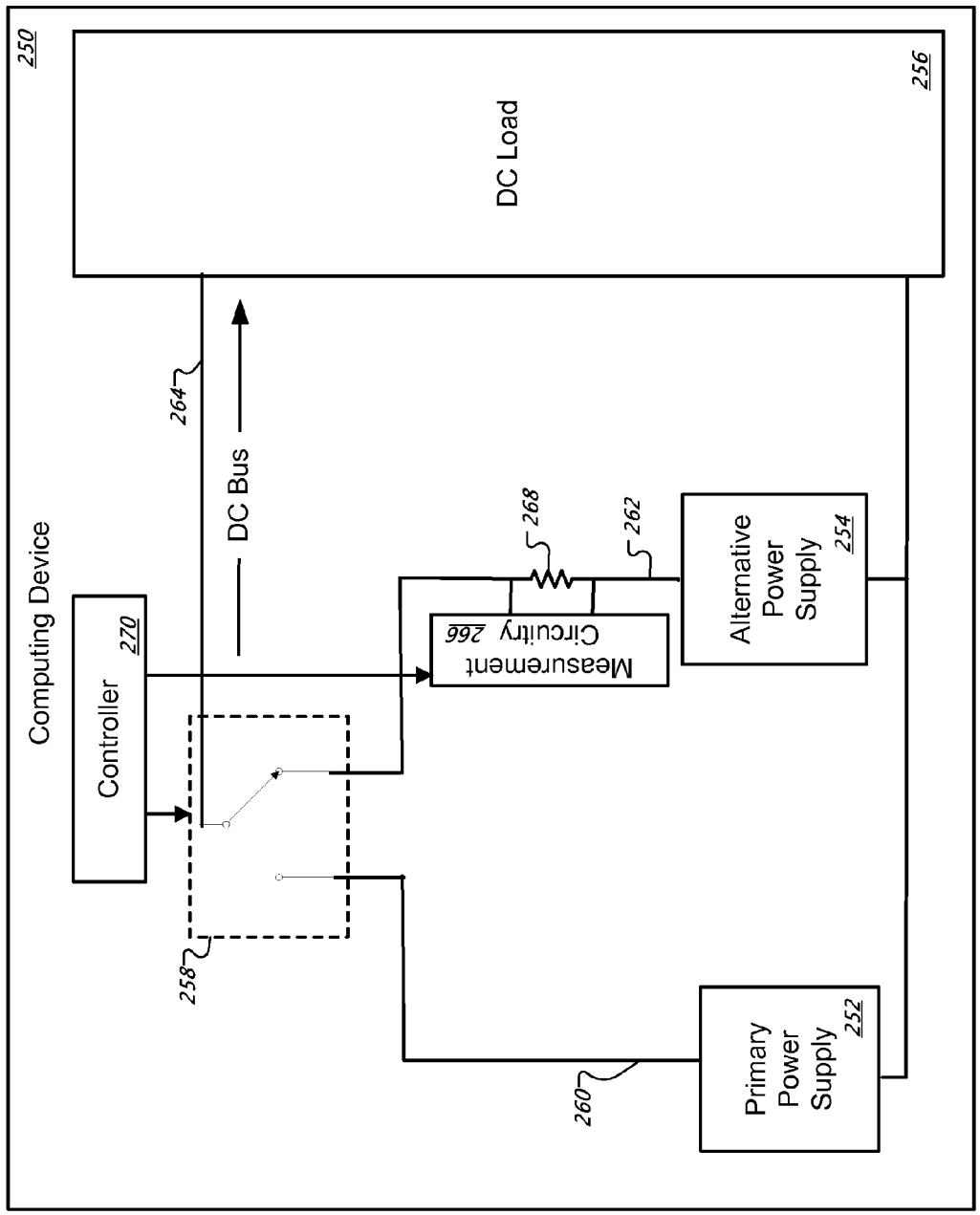
FIG. 2A is a schematic diagram illustrating an exemplary architecture for a computing device that includes a primary power supply and an alternative power supply.

FIG. 2A is a schematic diagram illustrating an exemplary architecture for a computing device 250 that includes a primary power supply 252 and an alternative power supply 254. In some implementations, the primary power supply 252 can include power received from an AC power source (examples of which are described in association with FIG. 1) that is input to an AC-DC converter. Although not required, in the example of FIG. 2A, the output 260 of primary power supply 252 is a single DC voltage that can provide DC power to a DC load 256 via a switch 258. In some implementations, the alternative power supply 254 can include power supplied from a battery (e.g., battery 185). The output 262 of the alternative power supply 254 can be a single DC voltage that can provide DC power to the DC load 256. In other implementations, the alternative power supply 254 can include power supplied from an alternative AC power source (an AC power source different from the AC power source that supplies AC power to the primary power supply 252). The alternative power supply 254 can include an AC-DC converter and other circuitry to produce a single DC voltage for output 262.

The output 262 of the alternative power supply 254 can be connected to DC bus 264. For example, the alternative power supply 254 can have an output that is compatible with the output of the primary power supply 252 (e.g., both the alternative and primary power supply output 3.5 V DC). Once connected, the alternative power supply 254 can provide the power to the DC load 256 via the switch 258.

As described above, the output 260 of primary power supply 252 can be input to switch 258, and the switch 258 can connect the output 260 of the primary power supply 252 to the DC bus 264, which can deliver DC power to DC load 256. In other implementations, switch 258 can disconnect the output 260 of primary power supply 252 from the DC bus 264 and connect the output 262 of the alternative power supply 254 so that the latter supplies the power for the DC load 256 on the DC bus 264.

Controller 270 can control switch 268. For example, the controller 270 can receive commands from an external source (not shown) to open or close the switch 268, which effectively connects the output 260 or the output 262 to the DC bus 264, respectively. In another example, the controller 270 can generate the commands to manipulate the switch based on instructions accessible directly by the controller instead of receive commands from the external source.

Measurement circuitry 266, resistor shunt 268, and the controller 270 can be used to measure the power consumption of the DC load 256 by, for example, measuring the current on the DC bus 264 that connects the alternative power supply 254 to the DC load 256. The measured power output by the alternative power supply 254 can be used to determine the power output of the primary power supply 252. This determination can occur as the DC load 256 is the same load for both the alternative power supply 254 and the primary power supply 252. For example, these measurements can occur at various points in time when the power consumption of the DC load 256 may vary allowing for the collection of statistical information related to the power consumption of the DC load 256. The statistical information may be used to manage system processing loads, as described with reference to FIG. 1.

The voltage drop across the resistor shunt 268 can be determined by measurement circuitry 266. As was described with reference to FIG. 1, using Ohms law, and knowing the value of the resistor shunt 268, as well as the voltage drop across it, the current through the resistor shunt 268 can be calculated. Therefore, the power dissipated across the resistor shunt 268 can be determined, which indicates the processing circuit load. Details of how the measurements are made and how the values are calculated are described later in the document with reference to FIGS. 2B, 3A and 3B.

In certain implementations, the controller 270 may disconnect the primary power supply 252 from the DC bus 264 and connect the alternative power supply in the former's stead. This may be performed when testing the power consumption of the DC load 256. The controller 270 can then control measurement circuitry 266, which can perform the measurements needed to determine the power consumption of the DC load 256. Once the measurement is performed, the controller 270 can receive a command to use switch 258 to reconnect the primary power supply 252 to the DC bus 264. The measurements taken and the calculations performed by the measurement circuitry 266 will be described in more detail with reference to FIG. 2B.

Figure 2B:
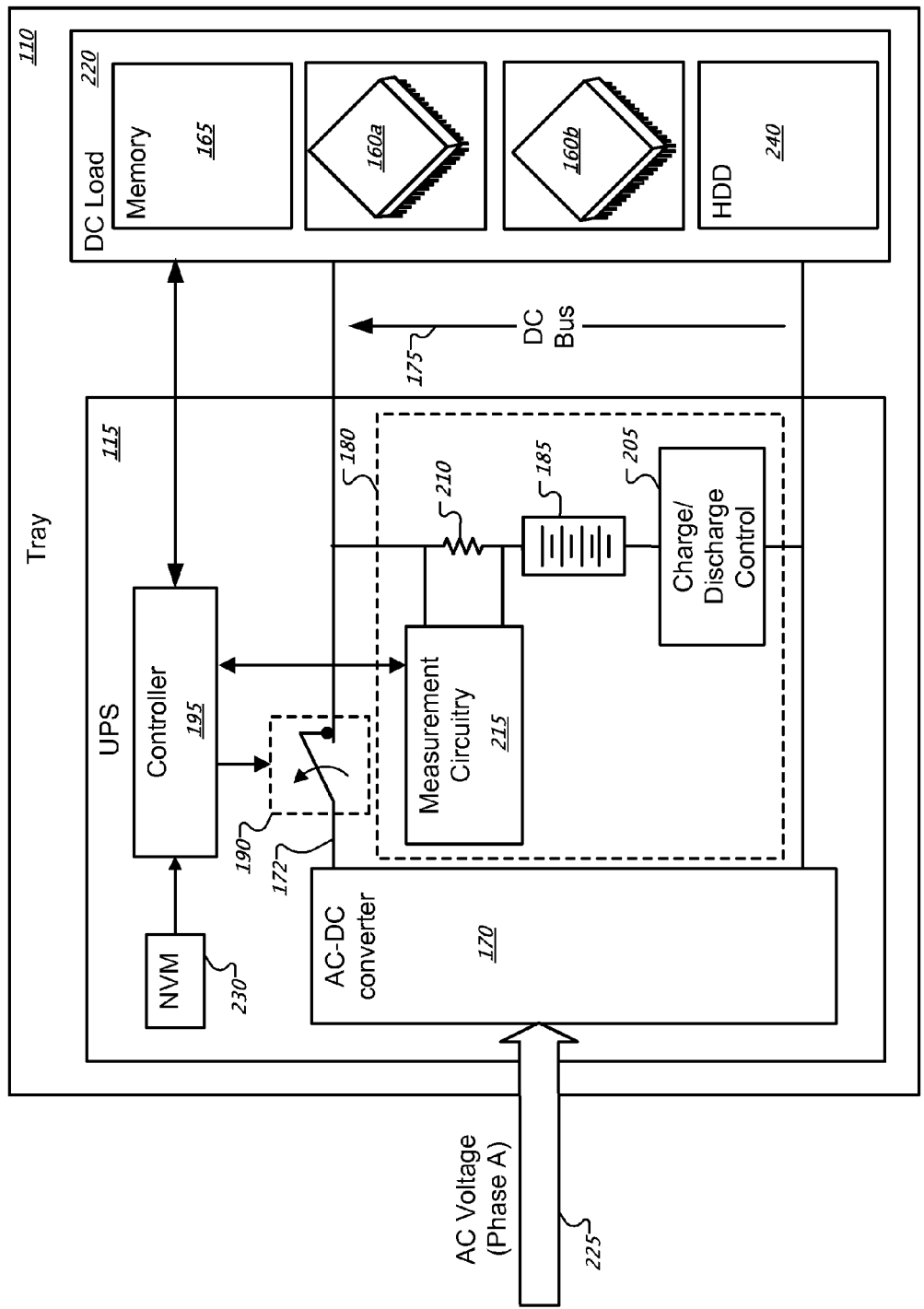
FIG. 2B shows an example of a tray schematic in additional detail.

FIG. 2B shows an example schematic of a tray 110 in additional detail. In various implementations, the AC-to-DC converter 170 may regulate the single output voltage on the DC bus 175 to a set point. The set point may be a static value in some implementations, or it may be dynamically determined during operation. For example, the set point may be based, at least in part, on one or more electrical characteristics of the battery 185.

In the implementation of FIG. 2B, for example, battery 185 may be the alternative power supply 254 of FIG. 2A. The primary power supply 252 may include power supplied from electric utility 130, as shown with reference to FIG. 1, as AC voltage input to the AC-DC converter 170 on AC bus 225.

In the depicted implementation, the UPS 115 includes a charge/discharge control circuit 205 in series connection with the battery 185, which is also in series with resistor shunt 210. A measurement circuit 215 is included on the UPS for measurement of voltage drops across the resistor shunt 210. In certain implementations, this measurement can be used to determine the power used by electrical loads (e.g., DC loads 220). The exemplary UPS further includes the controller 195 in operative connection with a non-volatile memory (NVM) 230. The controller 195 can control the measurement circuitry 215 based upon values contained in the NVM 230. In certain implementations, the measurement circuitry 215 can be integrated into the controller 195, although it is shown separately in FIG. 2B for illustration purposes. The series connected battery 185, resistor shunt 210, and charge/discharge control circuit 205 are connected to the DC bus 175. Responsive to a signal to switch to battery power, the circuit 205 can operatively connect the battery 185 across the DC bus 175 to permit the battery to discharge to the DC load 220 through the resistive shunt 210.

When the AC input voltage signal on AC bus 225 is not faulted or the controller 195 receives a signal to return to AC power, the circuit 205 may selectively permit charging current to flow from the DC bus 175 to charge the battery 185.

Responsive to a signal to measure the power used by DC load 220, switch 190 is switched, for example, from a closed position to an open position. This disconnects the DC voltage from the AC-DC converter 170 to the DC bus 175 leaving the battery 185 connected to the DC bus 175. In certain implementations, the measurement circuit 215 measures a voltage drop value across resistor shunt 210 also in response to the signal. The voltage drop value can be returned to the controller 195. The controller 195 may then generate a signal that closes switch 190 and reconnects the DC voltage to the DC bus.

In some implementations, the controller 195 can determine the power consumption of the DC load 220 by using the voltage drop measurement value and the value of the resistor shunt 210. The resistor shunt value can be stored in the NVM 230, for example, during manufacture. The controller 195 can access the NVM 230 to retrieve this value, when needed, for use in a power calculation. The power consumption of the DC load 220 can be calculated using a derivative of Ohm's law, where:

$$P=V^2/R$$

where V is the voltage drop across the resistor shunt, R is the value of the resistor shunt, and P is the power consumption.

In another implementation, the controller 195 can determine the power consumption of the DC load 220 by measuring the current, i, flowing through the resistor shunt 210. The power consumption of the DC load 220 can be calculated using a derivative of Ohm's law, where:

$$P=i^2*R$$

where i is the current flow through the resistor shunt, R is the value of the resistor shunt, and P is the power consumption.

In another implementation, the controller 195 can determine the power consumption of the DC load 220 by using the voltage drop measurement value and by measuring the current, i, flowing through the resistor shunt 210. The power consumption of the DC load 220 can be calculated using a derivative of Ohm's law, where:

$$P=i*V$$

where i is the current flow through the resistor shunt, V is the voltage drop across the resistor shunt, and P is the power consumption.

The signal to measure the power used by DC load 220 can be generated on a recurrent basis. The point in time when the signal is generated can be a predetermined value for example, that can be stored in the NVM 230. The duration of the measurement can also be a value stored in NVM 230. These values may be stored during manufacturing time, upon first use, or dynamically updated during operation of the tray 110. For example, the tray 110 may be set up to measure the power consumption of DC load 230 for 30 seconds every hour at a certain minute during the hour (i.e. 5 minutes past the hour). In some implementations, each tray in a rack can be set up to measure the power consumption of its DC load at a particular point in time that differs from the other trays in the rack. For example, tray 1 can perform the power consumption measurement at five minutes past the hour, tray 2 can perform the measurement at ten minutes past the hour, etc. In certain implementations, staggering the measurements means only a predetermined number of trays are switched to battery voltage at one time. This can minimize down time that may occur if there are problems with a battery on a tray. For example, if a battery is not fully charged it may not supply sufficient voltage to the DC bus to operate the DC load on that tray. Therefore, the tray may not operate during the time that the battery is connected to the DC bus.

In the depicted implementation, the NVM 230 may also store set point information for regulating the output of the AC-to-DC converter 170. The set point information may be stored during manufacturing time, upon first use, or dynamically updated during operation of the tray 110. The controller 195 or the AC-to-DC converter 170 may read or use the stored set point information to determine how to control the AC-to-DC converter 170. In addition to set point information, information about threshold conditions for switching over between AC input and battery operation may be stored in the NVM 230, for example.

Access to information stored in the NVM 230 may be provided through a serial or parallel interface (which may have a wired or infrared physical layer), for example, between the NVM 230 and one or more processors 160 on the DC load 220. Processors 160a, 160b may be used to access or update information in the NVM 230 via the network connections 140 to each tray 110.

Additional data storage devices may be provided on the DC load 220. In the depicted example, the DC load 220 includes two processors 160 in operative connection with the memory 165 and a hard disc drive (HDD) 240.

Figure 3A:
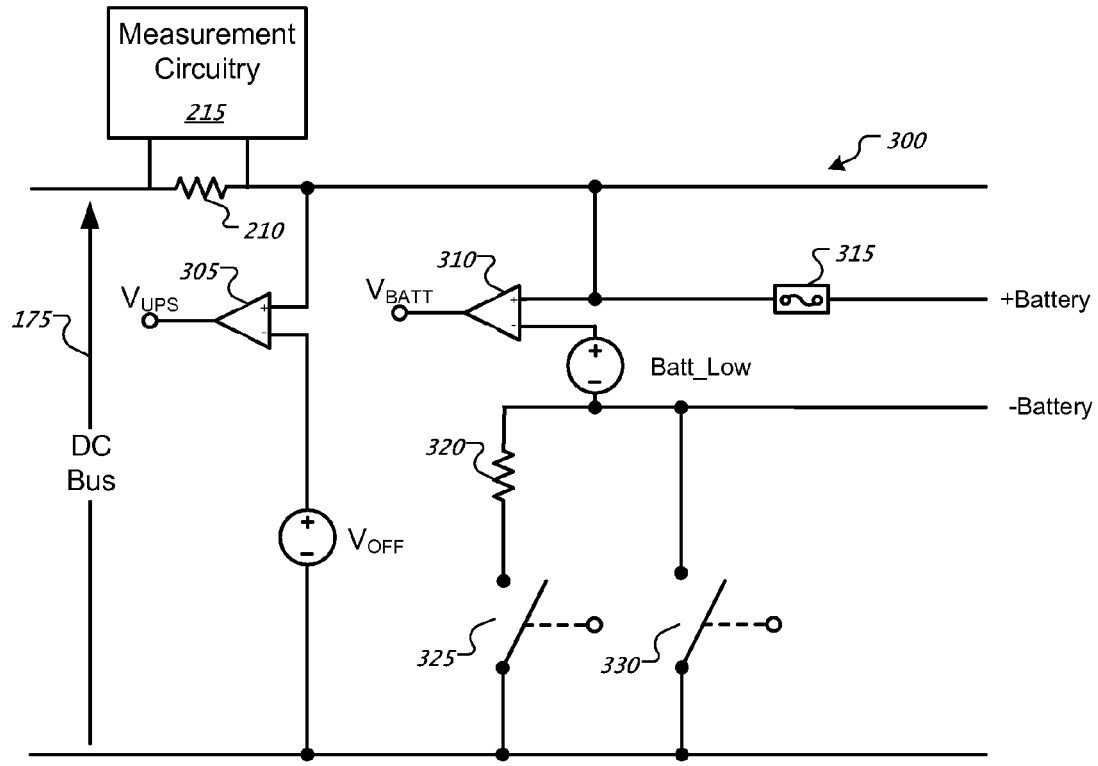
FIGS. 3A and 3B are schematic diagrams showing details of a battery circuit in an exemplary power distribution architecture.
Figure 3B:
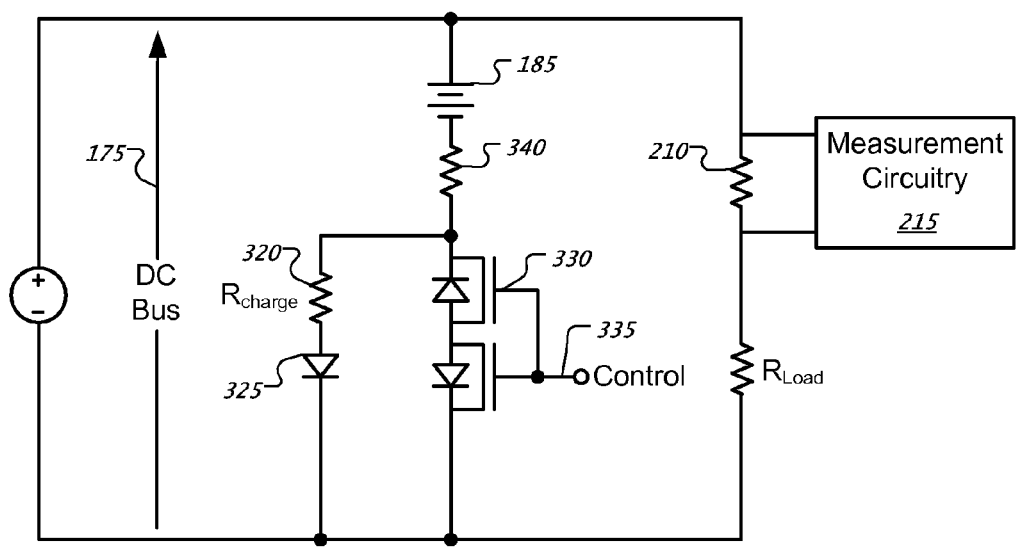

FIGS. 3A-3B are schematic diagrams showing details of a battery circuit in an example power distribution architecture.

FIG. 3A shows an example schematic 300 for a portion of the charge/discharge control circuit 205, which is described with reference to FIG. 2B. The schematic 300 includes a comparator circuit 305 to toggle a signal $V_{UPS}$ when the voltage on the DC bus 175 falls below a threshold, $V_{OFF}$. The schematic 300 also includes a comparator circuit 310 to toggle a signal $V_{BATT}$ when the voltage on the DC bus 175 falls below a threshold, Batt_Low.

The schematic 300 further includes an over-current protection element 315, which in this example includes a fuse. One terminal of the fuse 315 connects to a positive terminal of the battery, and the other terminal connects to a positive rail of the DC bus 175. In other examples, additional series or shunt devices to provide over-current, over-voltage, reverse protection, EMI mitigation, or other functions.

In the depicted implementation, a pair of terminals (+Battery, −Battery) is connectable to a battery. The negative battery terminal (−Battery), connects to two parallel paths, each of which is controllable by operation of a switch. One of the parallel paths connects the negative battery terminal to a negative rail of the DC bus 175 through a resistor 320 and a switch 325. This path permits a charging current to flow when the switch is closed. The amplitude of the charging current is substantially limited by the value of the resistance 320 and the difference between the voltage on the DC bus 175 and the battery (not shown). The internal resistance of the battery is typically much less than the value of the resistance 320. In some implementations, the voltage drop across the resistance 320 may be used to measure or control the charging current.

The other parallel path connects the negative battery terminal to a negative rail of the DC bus 175 through a switch 330. When the switch 330 is closed, the battery is operatively connected across the DC bus 175. In this state, the battery can discharge and supply operating power to any DC loads (not shown) that are also connected across the DC bus 175.

The switches 325, 330 may be passive or actively controlled. An example implementation, shown in FIG. 3B, is illustrative of one implementation, and is not to be taken as limiting.

In FIG. 3B, the battery 185 is modeled with a series resistance 340 that may represent internal or contact resistance, for example. The ideal switch 325 (FIG. 3A) for charging the battery is implemented as a diode with no active control input. In this implementation, the AC-to-DC converter 170 (not shown) may regulate the DC bus 175 to a voltage that is sufficient to forward bias the diode (switch) 325 over temperatures of interest and to provide a desired charging current. As such, the set point may be at least the maximum charging voltage plus a diode drop voltage.

In the depicted example of FIG. 3B, the battery charging current is determined, at least in part, by a series resistance and a unidirectional current mechanism, such as a diode or other semiconductor switch, for example. In other implementations, the battery charger may include a series-pass regulator (e.g., low drop out (LDO) linear regulator) or a switch mode power converter (e.g., buck, boost, buck-boost, Cepic, Cuk, flyback, charge pump, or resonant, etc.), either alone or in combination. The battery charge current may be controlled by current mirror techniques, or using current measurement feedback techniques involving current sense resistance or inductive coupling measurement, for example.

The ideal switch 330 (FIG. 3A) for discharging the battery is implemented as a back-to-back MOSFET (metal oxide semiconductor field effect transistor) switch configured to block current in both directions when in a non-conductive state. The switch 330 opens and closes in response to a control signal 335 that may be generated, for example, by the controller 195 (FIG. 2B), for example. In various implementations, the switches 325, 330 may include Schottky diodes, insulated gate bipolar transistors (IGBTs), or other semiconductor or electro-mechanical switches (e.g., relays).

Figure 4:
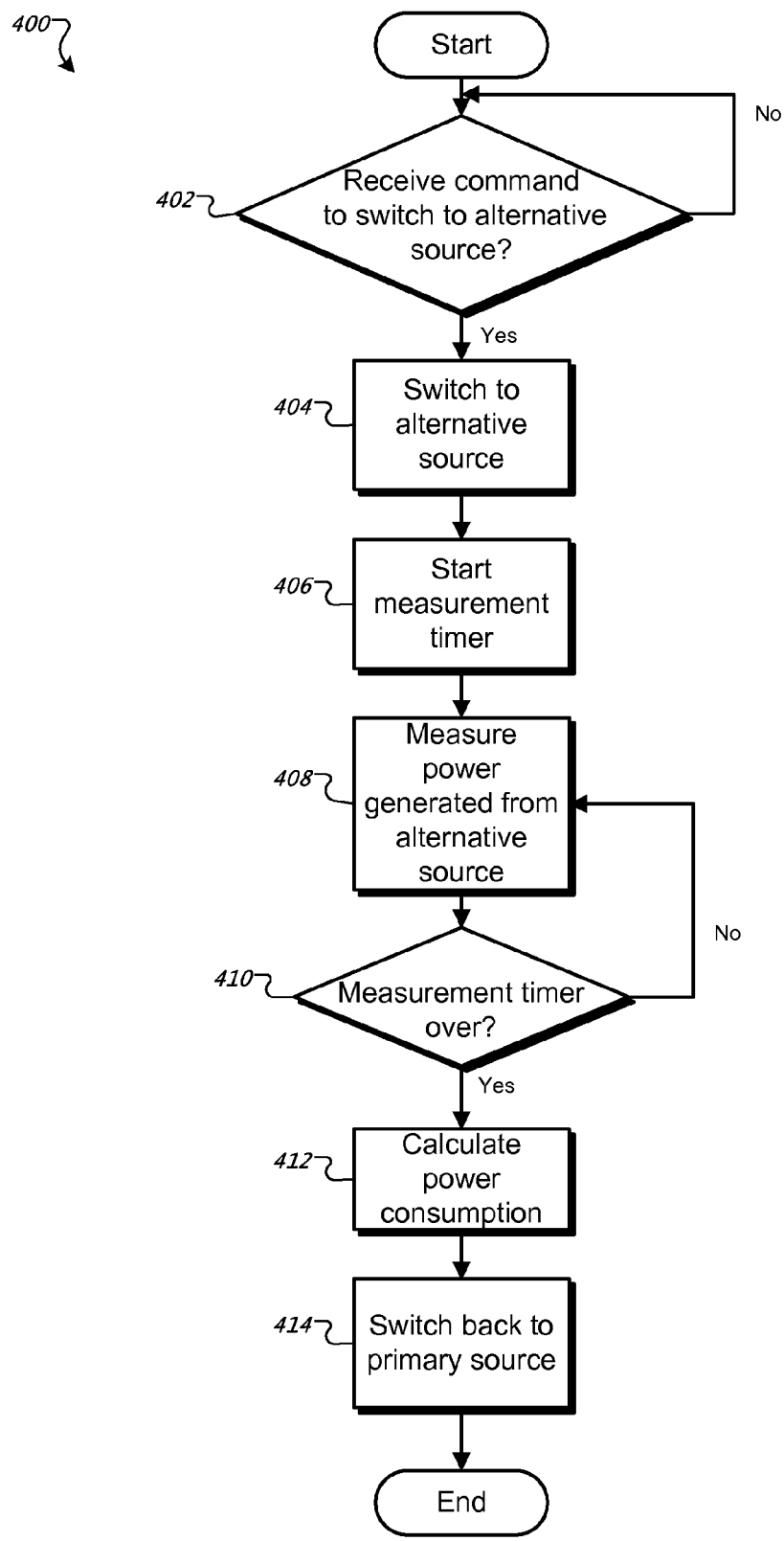
FIG. 4 is a flowchart of an exemplary method for calculating the power consumption of a tray.

FIG. 4 is a flowchart of an exemplary method 400 for calculating the power consumption of the tray 110. The method 400 starts by waiting for a command to switch from a primary source to an alternative source. For example, the controller 195 can issue a command to the switch 190 to instruct the switch 190 to open and disconnect the DC voltage 172 from the DC bus 175, in step 402. In step 404, when the command is received, a primary power source is switched out for a secondary, or alternative power source. For example, the switch 190 opens and the DC voltage 172 is disconnected from the DC bus. In this state, the battery 185 effectively provides voltage to the DC bus 175. In step 406, a measurement timer is started. For example, the controller 195 can send a command to the measurement circuitry 215, which starts a measurement timer. During this measurement time, a measurement of the power consumption of the DC load (e.g., DC load 220) can be performed.

In step 408, power generated by the alternative source is measured. For example, a measurement is taken of the voltage drop across a resistor shunt (e.g., resistor shunt 210). In certain implementations, the measurement is continuously performed until the measurement timer expires, as shown in step 410. In step 412, the power consumption of the DC load can be calculated using the measured value. This can be performed using, for example, Ohm's law as was previously described above, with reference to FIG. 2B. The measurement circuitry 215 can send the result of the calculation of the power consumption of the DC load to the controller 195. In step 414, the alternative power source can be switched out for the primary power source. For example, the controller 195 can command the switch 190 to close, connecting the DC voltage 172 back onto the DC bus 175. Next, the method 400 can end.

In some implementations, the controller 195 can store the power consumption calculation result in memory on the motherboard (e.g., memory 165 on motherboard 120) for future use. In one implementation, the power consumption calculation result can be used in determining power consumption trends over time. In another implementation, the result can be used, along with other power consumption calculation results for other trays in a rack (e.g., tray 110 in rack 125a), to determine the total power consumption of a rack.

Figure 5:
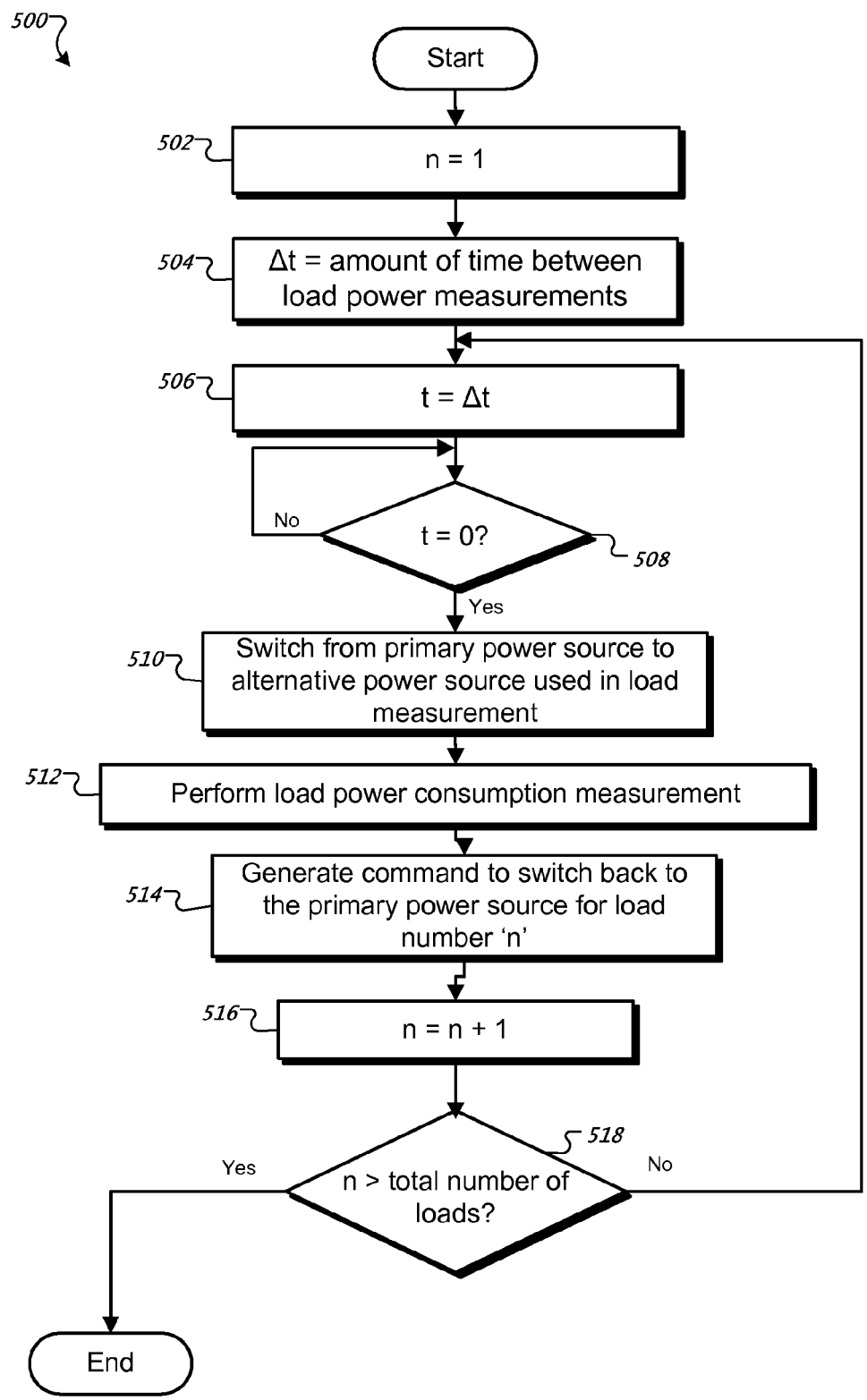
FIG. 5 is a flowchart of an exemplary method for calculating the power consumption of multiple trays in a rack in a sequential order.

FIG. 5 is a flowchart of an exemplary method 500 for calculating the power consumption of trays in racks in a data center in a sequential order. The method 500 starts by setting the value of the current motherboard being measured, n, equal to one, in step 502. This value is an indicator of which motherboard on which tray in which rack is to be measured. This number, for example, can be an index into a table of motherboard serial numbers stored in memory on a particular tray in a specific rack in the data center 105. This table can also be stored, in another example, in memory on the remote computer 150.

Next, the amount of time between load power consumption measurements is set equal to a value, Δt, in step 504. For example, the amount of time between motherboard power consumption measurements, Δt, can be a value contained in the NVM 230. This value can be read from the NVM 203 by controller 195.

Next a timer, t, is set equal to the time between motherboard measurements, Δt, in step 506. For example, motherboard power consumption measurements can be taken every 30 seconds (e.g., Δt equal to 30 seconds). Therefore, Δt can be equal to 30 seconds and the timer, t, will be set equal to 30 seconds.

The time between motherboard power consumption measurements can be determined based on the duration of the measurement. For example, if it takes 15 seconds to perform a motherboard power consumption measurement, selecting Δt equal to 30 seconds can assure that one motherboard power consumption measurement is performed at a time.

The method 500 waits until the timer, t, expires, in step 508. When it does, an alternative power source is switched in and used in a power consumption measurement for a load. For example, the controller 195 can generate a command to switch 190 to command it to open, disconnecting the DC voltage 172 from the DC bus 175 for the motherboard selected. A load power consumption measurement is then performed, in step 512, as was described with reference to FIG. 4. In step 514, a command is generated to switch back to the primary power source for load number "n." For example, once the power consumption measurement is complete, the controller 195 can generate a command for the switch 190 to close. This will connect the DC voltage 172 back to the DC bus 175.

The identifier for the current load (e.g., a motherboard) being measured is incremented by one, in step 516, indexing to the next load to be measured. For example, this motherboard can be, for example, the next motherboard placed in the rack below the motherboard just measured. In another example, this motherboard can be any motherboard located in any rack in the data center.

In step 518, a check is made to determine if all loads (e.g., motherboards in the racks in the data center) have been measured for power consumption. If this is true, in step 518, the methods 500 ends. If this is not the case, the method 500 continues from step 506 by setting the timer, t, equal to the time between motherboard measurements, Δt. In some implementations, the method 500 does not end after step 518, but is repeated indefinitely.

In some implementations, the method 500 can be started at a predetermined time of day. This predetermined time can be a value stored in the NVM 230 and read by the controller 195 for use in controlling the measurement circuitry 215. For example, the method 500 can start at 12:00 am. Therefore, at 12:00 am, the controller can initiate method 500 to start a power consumption measurement process. Each tray in the racks of the data center can have a unique start measurement time stored in its NVM (e.g., NVM 230). The unique start time of method 500 for each tray may ensure that only one motherboard power consumption measurement will be taken at a time.

In other implementations, multiple, but not all, trays in the data center are associated with substantially similar power measurement start times. Power measurements for all the trays in a data center can then be accomplished in a shorter period of time than possible when measuring the power of each tray individually.

In other implementations, the method 500 can be started by a command received from the remote computer 150, for example. A specific tray in a rack in the data center can be responsible for receiving this command and initiating the start of the method 500. Each tray in the racks of the data center can also have a unique start time stored in its NVM (e.g., NVM 230) as in the previously described implementation.

Figure 6:
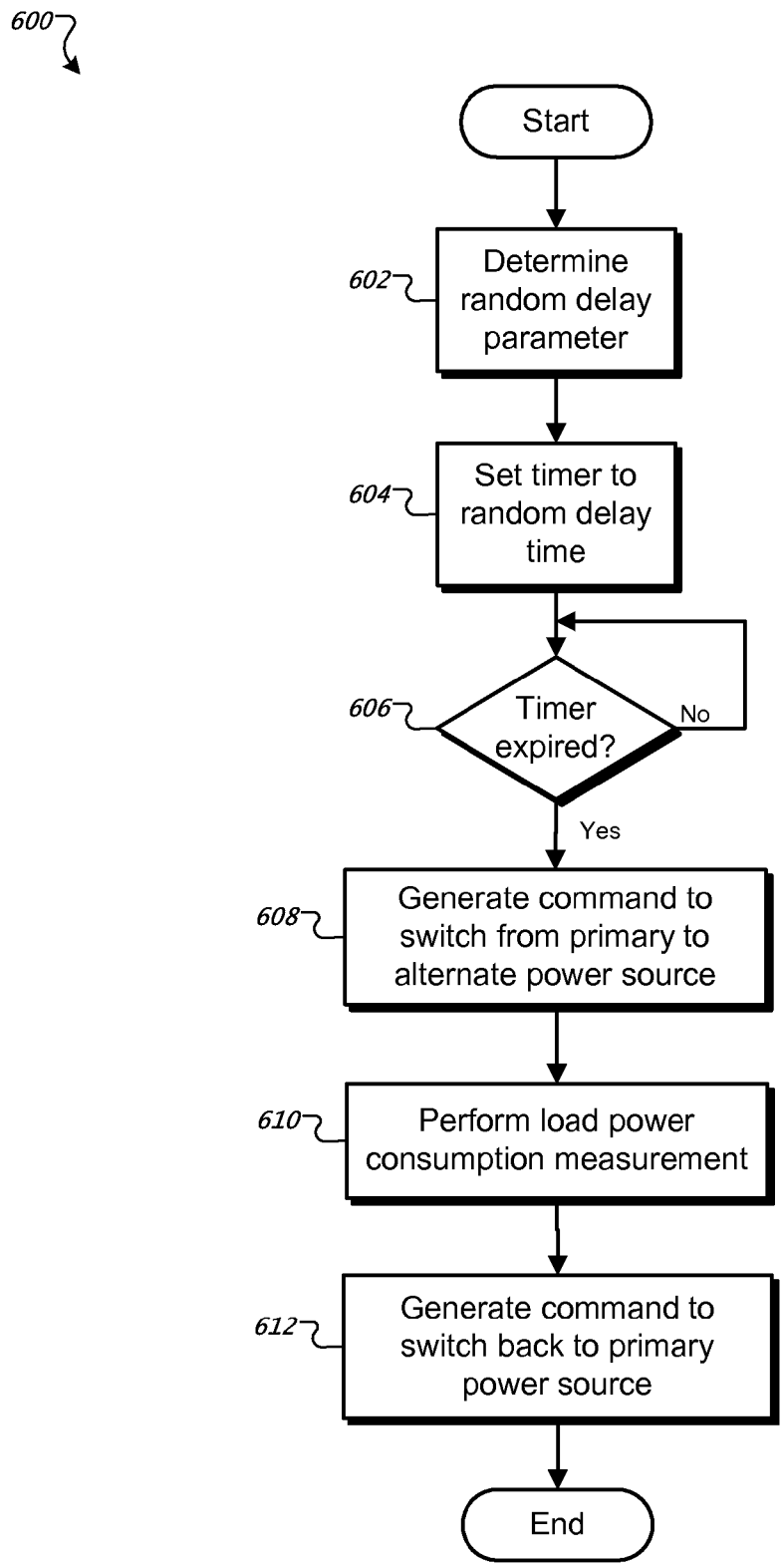
FIG. 6 is a flowchart of an exemplary method for calculating the power consumption of multiple trays in a rack in a random order.

FIG. 6 is a flowchart of an exemplary method 600 for calculating the power consumption of trays in racks in a data center in a pseudo-random order. For example, each tray in a rack can include a value (e.g., a serial number), which can be used to seed a random number generator. The random number generator can be used to generate a random delay parameter. This delay parameter can be used to set the time when a power consumption measurement can be taken for the motherboard included on that tray.

In some implementations, a serial number for a tray or a component on the tray can seed a random delay generator included in the controller 195, for example. The output of the random delay generator can be a time value used to specify when the controller 195 should switch to battery power. As described with reference to FIG. 2B, the controller 195 can command the switch 190 to disconnect the DC voltage 172 from the DC bus 175. In this state, the battery 185 effectively provides voltage to the DC bus 175. The power consumption of the DC load 220 can then be measured, as described with reference to FIG. 4.

The method 600 starts by determining the random delay parameter, in step 602. A timer is set equal to this random time delay value in step 604. If the timer has expired, in step 606, the controller 195 generates a command to, for example, open the switch 190. In step 608, a command is generated that switches out a primary power source for an alternative power source. For example, when the switch 190 is opened, the DC voltage 172 is disconnected from the DC bus 175. The battery 185 then effectively provides voltage to the DC bus 175. A load power consumption measurement is taken, in step 610, as was described with reference to FIG. 4. In step 612, once the measurement is complete, a command is generated to switch back to the primary power source. For example, the controller 195 generates a command to the switch 190 to close. This connects the DC voltage 172 onto the DC bus 175. Next, the method 600 ends.

A number of implementations have been described. Nevertheless, it will be understood that various modifications may be made. For example, some of the examples above describe switching from an AC-DC converter power source to a battery power source before measuring power from the battery power source, however, this implementation is not limiting. In other implementations, the switching occurs between other power sources with compatible outputs. For example, a primary power source can include a primary DC power supply and an alternative power source can include an alternative DC power supply. A controller can initiate switching from the primary DC power supply to the alternative DC power supply before measuring the power from the alternative DC power supply. In another example, an alternative power source can include a super-capacitor, which can be switched in for a primary power source before initiating power measurement.

In other implementations, advantageous results may be achieved if the steps of the disclosed techniques were performed in a different sequence, if components in the disclosed systems were combined in a different manner, or if the components were replaced or supplemented by other components. Accordingly, other implementations are within the scope of the following claims.

What is claimed is:

1. A method comprising:
    transitioning an electrical load on a first computing device due to a processing load from a primary power supply to an alternative power supply in response to a command from a controller;
    measuring power drawn from the alternative power supply;
    transitioning the electrical load from the alternative power supply to the primary power supply;
    storing a value that represents the measured power drawn from the alternative power supply;
    using the stored value to estimate the power drawn from the primary power supply by the electrical load using the measured power drawn from the alternative power supply;
    determining whether to transition at least a portion of the processing load based at least in part on the estimated power drawn from the primary power supply by the electrical load; and
    causing at least a portion of the processing load to be assigned from the first computing device to a second computing device based on the determination to transition at least a portion of the processing load.

2. The method of claim 1, wherein measuring the power drawn from the alternative power supply comprises measuring the voltage across a resistive circuit element in series with the alternative power supply and the electrical load.

3. The method of claim 2, wherein measuring the power further comprises using the measured voltage and a stored resistive value for the resistive circuit element to determine a current through the resistive circuit element, which is used to determine the power drawn from the alternative power supply.

4. The method of claim 2, wherein the resistive circuit element is a shunt.

5. The method of claim 1 measuring the power drawn from the alternative power supply comprises measuring a current between the electrical load and the alternative power supply using a current sensor.

6. The method of claim 1, further comprising receiving a transition signal from a switch controller that causes the electrical load to transition to the selected alternative power supply or the primary power supply.

7. The method of claim 6, wherein the transition signal is transmitted from the switch controller using a system management bus (SMBus).

8. The method of claim 1, further comprising transitioning the electrical load from the primary power supply to an alternative power supply and back to the primary power supply at predetermined intervals.

9. The method of claim 1, further comprising transmitting the estimate of the power drawn from the primary power source to a remote system.

10. The method of claim 1, wherein a time during which the electrical load is transitioned to the alternative power supply is limited by a predetermined threshold.

11. The method of claim 1, further comprising comparing an output voltage of the alternative power supply with a threshold voltage to determine if the alternative power supply should be replaced.

12. The method of claim 1, wherein transitioning the electrical load from or to the primary or alternative power supplies comprises activating a switch that couples the electrical load to the selected primary or alternative power supply.

13. The method of claim 1, further comprising transitioning additional electrical loads from additional primary power supplies to additional alternative power supplies, the transitioning for each of the electrical loads is staggered based on a seed value.

14. A system comprising:
    a first power input port coupled to a first power supply;
    a second power input port coupled to a second power supply;
    an output port coupled to an electrical load due to a processing load executing on a first tray within a rack; and
    a controller and a data store including instructions to cause the controller to perform operations for estimating the power drawn from the primary power supply, the operations comprising:
        decoupling the output port from the first power input port and coupling the output port to the second power input port in response to a command from the controller;
        determining power consumed from the second power input port; and
        decoupling the output port from the second power input port and coupling the output port to the first power input port;
        storing a value that represents the power consumed from the second power input port;
        using the stored value to estimate power consumed from the first power input port based on the determined power consumed from the second power input port;
        determining whether to transition at least a portion of the processing load based at least in part on the estimated power drawn from the first power input port; and
        causing at least a portion of the processing load to be assigned from the first tray within the rack to a second tray based on the determination transition at least a portion of the processing load.

15. The system of claim 14, further comprising a switch means for coupling the output port to a selected first or second power input port.

16. The system of claim 14, wherein the first power supply comprises a generator, a utility mains, or an alternating current/direct current converter.

17. The system of claim 14, wherein the second power supply comprises a power supply having a power output that is compatible with the first power supply.

18. The system of claim 14, wherein the second power supply comprises a battery.

19. The system of claim 14, wherein the second power supply is a backup power source for the first power supply.

20. The system of claim 14, wherein the electrical load includes a server.

21. The system of claim 14, wherein the controller receives a signal from a remote computer that initiates execution of the operations.

22. The system of claim 14, wherein the controller receives a request from a remote computer for a value indicative of the determined amount of power consumed from the second power input port.

23. A system comprising:
control circuitry adapted to estimate power drawn from a first power supply by performing operations comprising:
transitioning an electrical load generated by one or more processor workloads from the first power supply to a second power supply in response to a command from the control circuitry;
measuring power drawn from the second power supply;
storing a value that represents the measured power drawn from the second power supply;
transitioning the electrical load from the second to the first power supply;
an interface to output the estimate of the power, the estimate determined based on the stored value representing the measured power drawn from the second power supply; and
a computer communicably coupled to the interface and adapted to receive the estimate of the power and determine whether to transition at least a portion of the processor workloads based at least in part on the estimated power and, based on a determination made to transition the portion of the processor workloads, cause the portion of the processor workloads to be assigned from a first server to a second server.

24. The system of claim 23, wherein measuring the power drawn from the second power supply is based on a value associated with a resistive component in series with the second power supply.

* * * * *

UNITED STATES PATENT AND TRADEMARK OFFICE
CERTIFICATE OF CORRECTION

| | | |
|---|---|---|
| PATENT NO. | : 7,991,588 B1 | Page 1 of 1 |
| APPLICATION NO. | : 12/020339 | |
| DATED | : August 2, 2011 | |
| INVENTOR(S) | : Krieger | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 318 days.

Signed and Sealed this
Twentieth Day of December, 2011

David J. Kappos
*Director of the United States Patent and Trademark Office*